Aug. 25, 1925.
M. W. STOMS
1,551,439
THROTTLING AIR BLOWING ELL
Filed July 7, 1922
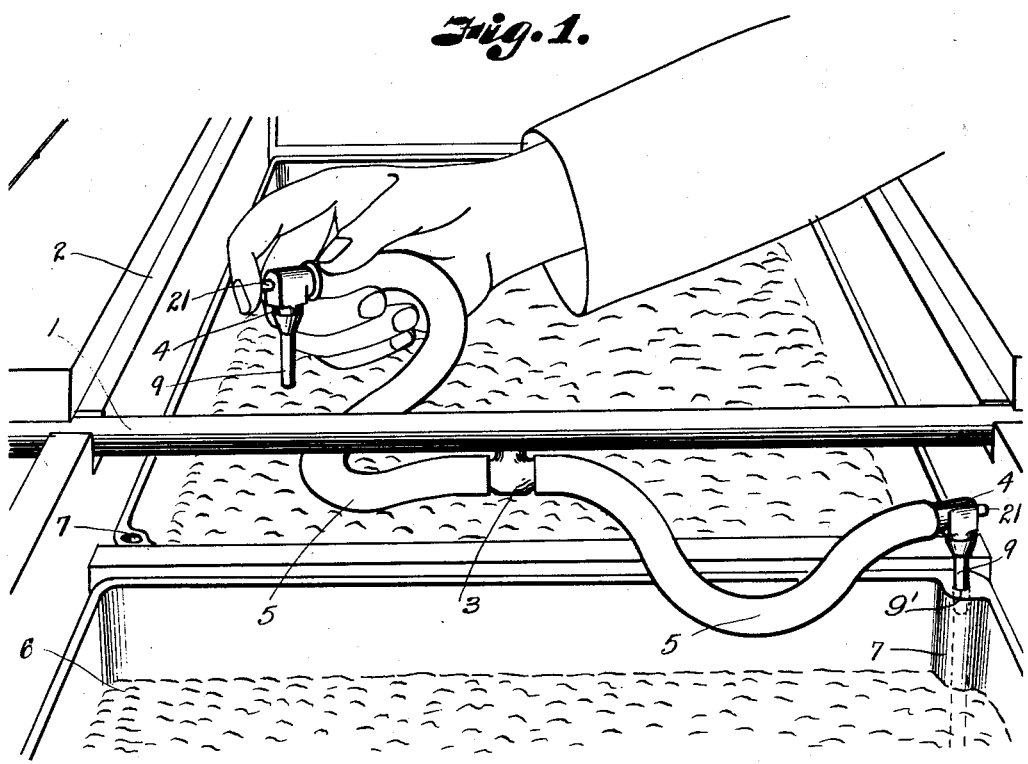
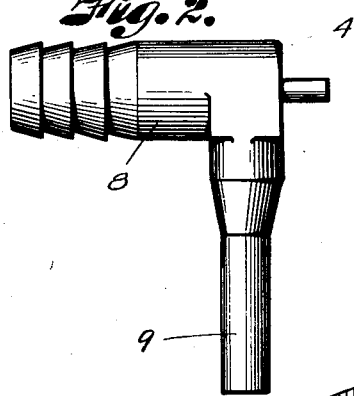
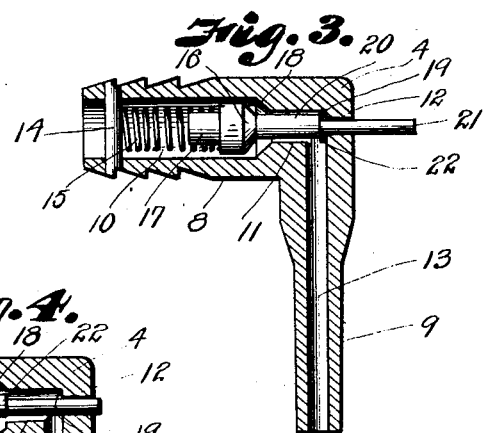
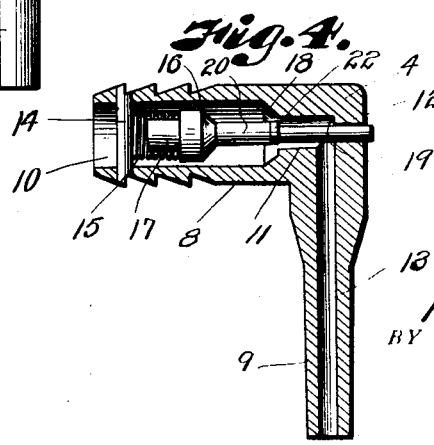
INVENTOR
Marion W. Stoms.
BY
ATTORNEY Patented Aug. 25, 1925.

1,551,439

UNITED STATES PATENT OFFICE.

MARION W. STOMS, OF OMAHA, NEBRASKA, ASSIGNOR TO BAKER ICE MACHINE CO. INC., OF OMAHA, NEBRASKA, A CORPORATION OF NEBRASKA.

THROTTLING AIR-BLOWING ELL.

Application filed July 7, 1922. Serial No. 573,506.

*To all whom it may concern:*

Be it known that I, MARION W. STOMS, a citizen of the United States, residing at Omaha, in the county of Douglas and State of Nebraska, have invented certain new and useful Improvements in Throttling Air-Blowing Ells; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention is an improvement in air blowing fittings with an internal throttling and cleaning valve, and relates to apparatus for the manufacture of ice from raw water under what is known as the high pressure air system, in which air at a comparatively high pressure, say from 18 to 20 pounds pressure, after being dehumidified, flows into the water to be frozen through a tube fixed in the can containing water, continuously throughout the freezing period.

It is of prime importance in an apparatus of this kind that a definite amount of air at a definite pressure be supplied to each can to secure the proper agitation of the water during the freezing process. Not only is the use of more air uneconomical, as the compression of unnecessary air is a waste of power, but too much air under certain freezing conditions, which commonly exist, produces an inferior block of ice.

An orifice to allow the passage of this required amount of air would be very small, approximately $\frac{1}{64}$ of an inch in diameter, and to drill such minute passages is very expensive and they are exceedingly easily clogged after being placed in operation.

The principal difficulty encountered is in maintaining an uninterrupted flow of air until the formation of the ice block has been substantially completed. The main source of interruption of the air current is due to the formation of frost or the collection of scale and sediment at the place where the throttling of the air occurs.

Blowing ells having their passageway restricted with wires have been tried but are only partially successful due to the fact that only the very minute particles of scale can pass through the restricted area, the large ones being retained, thus helping to clog the air passage, and due to the collection of frost at this point, which can only be removed by the operator using both hands to manipulate the restricting wire while in a very awkward and uncomfortable position.

Throttling orifices having a conical or pointed surface surrounding the inlet meet with even less success than the ell with a restricting wire. This pointed surface forms a trap for collecting the scale and sediment but does not provide a means for disposing of the frost which eventually collects at that point. In order to clean this orifice, the operator is compelled to disassemble the connection or fitting, scrape out the scale and sediment and open up the orifice with a fine wire or needle, and then reassemble it in place.

It is an almost universal fault that operators of ice plants do not and will not perform any work which entails additional effort on their part, if it can in any way be avoided. Cleaning of the air throttling devices above mentioned constitutes an expenditure of additional energy by the operator and consequently such cleaning is continually neglected. The clogging of the throttling device means a white block of ice instead of a clear block. White ice does not look as nice and actually is not so good as clear ice.

I have overcome the faults of the present throttling devices in the novel construction utilized in my throttling air blowing ell. The principal features which I desire to point out is the ease with which the operator can clean the passageway at every handling of the fitting, the reciprocating motion of the throttling valve which breaks and scrapes off any accumulated frost, and the full-sized opening or passageway secured for the blowing out of any accumulated scale, sediment or frost by the outrushing air.

It is always necessary for the operator to grasp the air connection when pulling out or filling up an ice can for disconnecting and connecting the air supply hose to the ice can. I provide a projecting stem on my throttling air blowing ell in such a position that the operator must press the stem inward when taking hold of this fitting for disconnecting and connecting it to the air tube in the cans. When this stem is pressed inwardly, the entire throttling valve is moved inwardly and when the pressure on the stem is released, a spring back of the valve pushes it outwardly. This gives the reciprocating motion necessary to dislodge any frost that may have collected in the area restricted by the valve, and further when the stem is pushed completely inward, the size of the passage through the restricted portion is increased to the full outlet size, thus permitting any accumulated scale or sediment to be blown out.

By means of my throttling air blowing ell I remove all the objections of the operator to cleaning this fitting each time he disconnects and connects it to the tube in the can. It will enable him to perform this work without expending any extra energy in doing so, and I have so arranged the throttling stem that it rapidly becomes second nature for him to press inwardly on this stem every time he manipulates the fitting.

In the drawings,

Fig. 1 is a perspective view of an air supply pipe with filling nozzles or ells flexibly connected thereto.

Fig. 2 is a side elevational view of the ell or fitting.

Fig. 3 is a longitudinal, sectional view therethrough, showing the cleaner in its normal position, and Fig. 4 is a view showing the cleaner retracted within the nozzle or ell.

Referring now to the drawings by numerals of reference and particularly to Fig. 1:

1 is an air lateral or tube, which in practice is embedded in the tank frame work 2 and it is connected to a suitable source of cold, dehumidified air, such as a main air header (not shown) which usually runs lengthwise of the tank and in which the ice cans are assembled.

An inverted, T-shaped fitting 3 is shown as screwed into the air lateral and each horizontal branch of the fitting is connected to a throttling air blowing ell or nozzle 4 by a flexible hose 5. The hose sections are held on the T branches and on the ells by a suitable means, such as by corrugating the receiving ends of the branches and the ells over which the flexible connection is drawn. If rubber hose is employed, ordinarily the elastic pressure of the hose will make an air tight connection but if other forms of flexible tubes are used, any ordinary hose clamp or wire may be used to fasten the ends of the flexible connections 5 at their respective ends.

The cans 6 are arranged in the frames as shown and at the corner of each can may be a tube or conduit 7 to receive the tapered end of the discharge nozzle or ell. The cans as shown are part of the equipment of known ice making plants and are well understood.

Referring to Figs. 2, 3 and 4, it will be observed that the discharge nozzle or ell 4 is provided with a leg 8, corrugated at its receiving end, and a tapered leg 9 at right angles to the leg 8. The corrugated leg has a passageway completely through it, the through passageway comprising two aligning passageways of different diameters. The tapered leg has a straight passageway which connects with the smaller of the aligning passageways in the corrugated leg adjoining the second reduction of the through passageway. The passageway 10 has a reduced diameter at 11; the portion 10, the portion 11 and the opening 12 in the end of the leg 8 all being concentric. The passageway 10, 11 communicates with the passageway 13 in the tapered leg 9.

Extending across the passageway 10 adjacent to the inlet end of the leg 8 is a pin 14, against which one end of a coil spring 15 bears, the other end bearing against the enlarged portion of the throttling member and surrounding the stud or projection 17 thereon. Since the spring 15 is an expansion spring, the normal tendency will be to force the enlarged portion 16 onto the conical shoulder 18, which could serve as a seat for the member 16 were it not for the fact that the longitudinal movement of the head 16 in one direction is limited by a shoulder 19 on the stem 20. The stem 20 carries a stem extension 21, which projects through the opening 12. The stem extension 21 is provided with a packing washer surrounding the opening 12 so that the air will not leak through it when the cleaning member and throttling member are in the position shown in Fig. 3.

It will be observed that the passageway 10 is enough larger in diameter to allow air to pass around the valve and that the passageway 11 is likewise greater in diameter than the stem 20. Therefore, when the cleaner and throttling valve is in the position shown in Fig. 3, the passage of air will not be closed off but the air will be throttled because the head 16 and stem 20 will reduce the effective port area. Therefore, the passages 10, 11 and 13 will allow the requisite amount of air to pass under normal conditions. The opening 12 is just large enough to allow the stem extension 21 to pass freely within it. In other words, the extension 21 passes through the opening 12 with a loose fit and the shoulder 19 maintains the packing washer 22 against the flat face at the end of the reduced passageway 11 so that there will be no leak of air. I prefer to grind the tapered nozzle 9 so that it will snugly fit in a tapered opening 9' in the tube 7 so that liability of its becoming dislodged or of air escaping between it and the wall of the tube 7 will be prevented.

When the parts are assembled the operator may take hold of the ell nozzle in the most natural position or manner, for example, as shown in Fig. 1. Then by exerting a little pressure with his fore-finger against the stem extension, as shown in Fig. 1, the throttling valve is pushed backwards into the passageway 10 until the gasket or washer of the same diameter as the stem 20 passes out of the passageway 11 into the passageway 10, thus increasing the effective size of the passageway through 10 and 11, which will be equal to or in excess of the passageway 13 in the tapered leg 9. This will permit any scale or sediment which has collected ahead of the throttling valve to be blown out. Any frost which may have formed on the throttling member 16, 20 and the walls of the passageway 11 will be scraped loose by the reciprocating motion produced on the throttling valve by the operator in pushing the valve inwardly, the spring 15 being effective in pushing it back into normal position when the operator releases pressure on the end of the stem extension 21.

It will be a natural movement to push on the end of the stem extension 21 when the nozzle or ell is picked up by the operator. Therefore, it is practically positive assurance that the stem and cleaner will be reciprocated every time the ell or nozzle is handled by the operator, that is, each time he moves it from the can. Thus liability of the nozzle becoming clogged or frozen will be reduced to a minimum if not wholly avoided.

An intermittent reciprocation of the stem 21 every time the nozzle is picked up by the operator will practically insure a constant supply of air in the freezing cans as it usually takes a longer time for the air passage to clog up than is consumed in supplying any one can with air.

It will be observed, too, that the head or enlarged portion 16 does not at any time entirely close off the supply of air but merely throttles it down to the proper effective port area for the purpose intended.

What I claim and desire to secure by Letters-Patent is:

1. An air blowing ell for refrigerating plants comprising a member having two legs at right angles one to the other, one of the legs having a passageway of relatively large diameter, an aligning passageway of relatively small diameter with a shoulder between the two passageways and an opening in its end adjacent to the other leg in line with the two passageways, the other leg having a through passageway communicating with the second-mentioned passageway, a spring-pressed throttling member in the first leg normally closing the opening in the end of the first leg and having an enlargement in spaced relation with the shoulder, the diameter of the enlargement being less than the diameter of the first-mentioned passageway and the diameter of the throttling member adjacent to the opening being greater than the opening but less than the diameter of the second passageway so that air may normally pass into the first leg around the throttling member and discharge through the passageway in the second leg, and means for imparting longitudinal movement to the throttling member to cause it to move out of the second mentioned passageway so as to increase the effective cross-sectional area of the second passageway, whereby an increased supply of air may pass through the passageway of the second named leg from the first named two passageways.

2. A throttling air blowing ell, having two legs, one at an angle to the other, one of the legs having a relatively large passageway and a relatively small passageway in alignment, with a throttling surface between them, a spring pressed reciprocatory cleaner member having an enlarged part located in the large passageway and a relatively smaller part normally located in the small passageway, there being a free space at all times between the cleaner member and the wall of the leg in which the cleaner is located and a reduced extension on the end of the cleaner extending through the end of the leg in which the cleaner is located, whereby pressure may be applied on said extension to longitudinally move the cleaner member to cause the small part of the cleaner to move into the large passageway to increase the air passageway beyond the throttling surface.

3. A throttling air blowing ell comprising two communicating legs at substantially right angles one to the other, one of the legs having a relatively large passageway and a relatively small passageway in alignment, with a throttling surface between them, a throttling valve in one of the legs having a relatively large part in the large passageway and a relatively small part in the small passageway, the throttling valve having a stem projecting from the small part, the stem being of reduced diameter whereby a shoulder is formed, the stem passing through an opening in the end of the leg, the shoulder normally closing the opening, the stem being accessible from the exterior of the ell to impart longitudinal movement to the throttling valve to move the small part of the valve into the large passageway to increase the opening through the leg and to uncover the opening normally closed by the shoulder so that air may pass through the ell without throttling.

4. An air delivery nozzle having one leg for attachment to a hose and another leg for attachment to a tube, the second leg having a tapered exterior, the legs having communicating passageways, the first leg having an opening in the end adjacent to the second leg, a reciprocatory member in the first leg for throttling the passageways and means accessible from the exterior of the nozzle for moving the reciprocatory member to vary the throttling effect of the reciprocatory member, the reciprocatory member having means for normally closing the opening in the end of the first leg.

5. An air delivery nozzle, comprising a member consisting of two legs at substantially right angles one to the other, one of the legs having a passageway, part of which is reduced in cross section to provide an interior shoulder, the other leg having a passageway communicating with the reduced part of the passageway in the first named leg, the first leg having a comparatively small opening in its end adjacent to the second leg, a reciprocatory stem in the reduced part of the passageway, normally closing the opening in the end of the first leg, the stem having a cross section less than that of the reduced part of the passageway, a throttling member on the stem in the larger part of the passageway, at all times spaced from the shoulder, the diameter of the throttling member being less than the diameter of the larger part of the passageway, and means for moving said stem to effect longitudinal movement of the stem and resultant movement of the throttling member away from the shoulder.

6. An air delivery nozzle comprising an L-shaped member having two aligning passageways of different diameters in one of the legs of the member and provided with an opening in its wall in line with the two passageways, a stem within one of the passageways and having a shoulder portion to normally bear against the wall of said nozzle surrounding the opening, a projection at one end of the stem extending through the opening, and enlarged portion on the opposite end of the stem and spaced away from the shoulder formed by the two adjacent passageways of different diameters, and a spring for normally urging the stem in one direction, the stem being adapted to be moved in the other direction by pressure applied to the stem projection.

7. A delivery nozzle for supplying air to ice cans of refrigerating apparatuses, comprising a hollow L-shaped member having an inlet and an outlet and provided with a hole through its wall intermediate the inlet and outlet, and a spring pressed valve normally closing the hole, said valve having a throttling member normally in a constricted portion of the passageway but movable into an enlarged portion of the passageway to prevent throttling of the air between the inlet and the outlet.

In testimony whereof I affix my signature.

MARION W. STOMS.